United States Patent
Andrews

(10) Patent No.: US 10,728,301 B1
(45) Date of Patent: Jul. 28, 2020

(54) CRYPTOGRAPHIC CONTENT DELIVERY NETWORK

(71) Applicant: Highwinds Holdings, Inc., Winter Park, FL (US)

(72) Inventor: Bradley Michael Andrews, Maitland, FL (US)

(73) Assignee: Highwinds Holdings, Inc., Dallas, TX (US)

( * ) Notice: Subject to any disclaimer, the term of this patent is extended or adjusted under 35 U.S.C. 154(b) by 361 days.

(21) Appl. No.: 15/385,643

(22) Filed: Dec. 20, 2016

Related U.S. Application Data

(60) Provisional application No. 62/270,496, filed on Dec. 21, 2015.

(51) Int. Cl.
| | |
|---|---|
| *H04L 29/06* | (2006.01) |
| *H04N 21/235* | (2011.01) |
| *H04N 21/237* | (2011.01) |
| *H04N 21/239* | (2011.01) |

(52) U.S. Cl.
CPC .......... *H04L 65/605* (2013.01); *H04L 65/105* (2013.01); *H04L 65/1063* (2013.01); *H04N 21/237* (2013.01); *H04N 21/239* (2013.01); *H04N 21/2351* (2013.01)

(58) Field of Classification Search
CPC ................. H04L 67/10; H04L 65/4076; G06F 17/30038; G06F 17/3082; G06F 2221/2119
USPC ........................... 709/219, 223; 713/153, 154
See application file for complete search history.

(56) References Cited

U.S. PATENT DOCUMENTS

| | | | |
|---|---|---|---|
| 7,111,057 B1* | 9/2006 | Sherman ................. | H04L 63/14 709/223 |
| 8,667,088 B1* | 3/2014 | Maniscalco ......... | H04L 65/4084 709/219 |
| 8,995,815 B2* | 3/2015 | Maharajh .............. | G06F 16/437 386/205 |
| 9,124,650 B2* | 9/2015 | Maharajh ................ | G06F 21/10 |
| 9,635,041 B1* | 4/2017 | Warman .................. | H04L 41/50 |
| 10,164,993 B2* | 12/2018 | Warman .................. | H04L 41/50 |
| 2011/0131408 A1* | 6/2011 | Cook .................. | G06F 21/6218 713/153 |
| 2011/0154130 A1* | 6/2011 | Helander ................ | G06F 21/51 714/48 |
| 2012/0124372 A1* | 5/2012 | Dilley ................. | H04L 67/2819 713/162 |
| 2015/0288647 A1* | 10/2015 | Chhabra ............. | H04L 61/1511 709/245 |
| 2016/0212101 A1* | 7/2016 | Reshadi .............. | H04L 63/0414 |

(Continued)

*Primary Examiner* — Tesfay Yohannes
(74) *Attorney, Agent, or Firm* — Knobbe, Martens, Olson & Bear, LLP

(57) ABSTRACT

An edge server of a content delivery network (CDN) can serve as a proxy for an origin server. The edge server can remove distinguishing characteristics of the origin server. As a result, an end user system may be prevented from blocking content from the origin server based on the distinguishing characteristics. Additionally or alternatively, the edge server can encrypt a portion a uniform resource locator (URL) referencing the origin server so that the clear text of the URL does not follow a recognizable pattern. The path can be decrypted by the edge server when the edge server communicates with the origin server to retrieve the content from the origin server.

17 Claims, 10 Drawing Sheets

(56) References Cited

U.S. PATENT DOCUMENTS

2017/0237775 A1\* 8/2017 Lu .................... H04L 63/101
726/4

\* cited by examiner

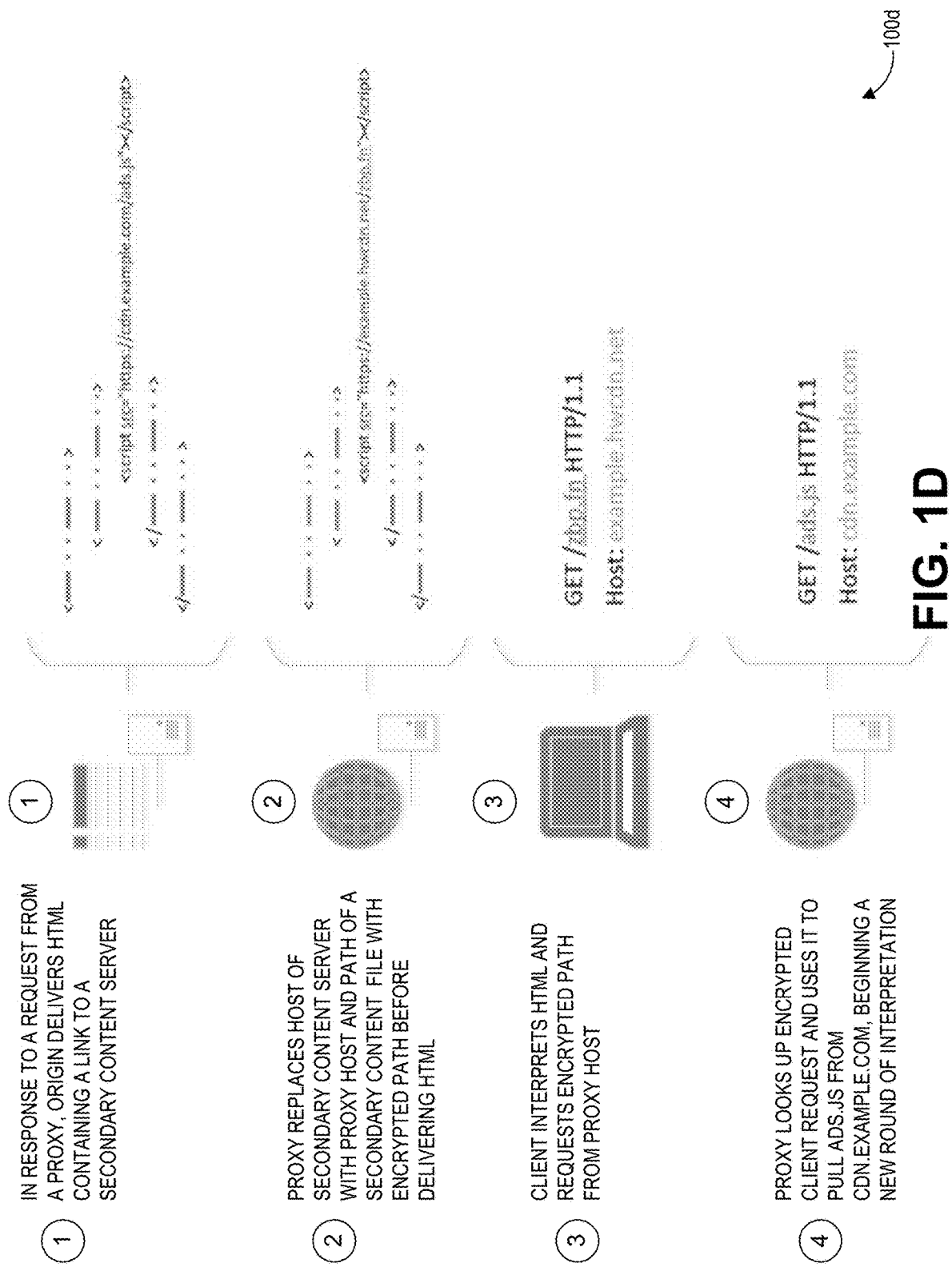

CRYPTOGRAPHIC CONTENT DELIVERY NETWORK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Content publishers can deliver audio or visual content to end users. Sometimes, the content publishers can deliver the audio or visual content to end users through a Content Delivery Network (CDN). In a CDN, a content provider typically has a group of files or content library which they wish to make available for retrieval to a geographically distributed set of end users, typically by download or streaming protocols. A content delivery provider provisions these files to multiple computers or "edge nodes" over a network, such as the Internet, so that for many users there is a download or streaming location which can be physically closer to the users. The download or streaming location may also provide lower network latency or have higher capacity than the original location where the content provider's files are stored.

SUMMARY

In one aspect, a system for using cryptography to deliver content in a content delivery network (CDN) is disclosed. The system comprises a data store configured to store information associated with modifying at least a portion of a uniform resource locator (URL) that addresses content. The URL comprises a host and a path. The system can also comprise a network interface configured to communicate with an end user system and an origin server and a content processing system comprising a hardware processor. The hardware processor is configured to receive a first request from the end user system to retrieve the content, wherein the first request comprises the URL of the content; identify the host and the path of the URL, wherein the host indicates the content processing system; perform a decryption on at least a portion of the path of the URL to generate a decrypted path; determine whether the decrypted path is associated with a file location of the content; in response to a determination that the decrypted path is associated with the file location of the content, send a second request to the origin server, wherein the second request comprises the decrypted path, receive the content associated with the decrypted path, and communicate the content to the end user system.

In another aspect, a method for using cryptography to deliver content in a CDN is disclosed. The method may be performed by a hardware processor. The method comprises receiving a request for a first content from an end user system, the request comprising a first URL referencing a first origin server; retrieving the first content from the first origin server using the first URL, wherein the first content comprises a second URL referencing second content hosted by a second origin server; parsing the second URL to identify a path and a host associated with the second URL; encrypting at least a portion of the path to generate an encrypted path; modifying the host to reference an edge server in a CDN to generate a modified host; modifying the second URL by replacing the path of the second URL with the encrypted path and replacing the host of the second URL with the modified host to generate a modified second URL; replacing the second URL in the first content with the modified second URL; and delivering the first content to the end user system, wherein the modified second URL is embedded in the first content.

In yet another aspect, a non-transitory physical computer storage is disclosed comprising computer-executable instructions stored thereon that, when executed by a hardware processor, implement operations for using cryptography to deliver content in a CDN. The operations comprise receiving a first request from an end user system to retrieve content; identifying a host of the content and an encrypted path to the content; decrypting the encrypted path to generate a decrypted path; identifying an origin server based on the decrypted path, wherein the origin server stores and delivers the content; setting the host of the content to the origin server; sending a second request to the origin server, wherein the second request comprises the decrypted path; receiving the content from the origin server using the decrypted path, and communicating the content to the end user system wherein the content is represented by the host and the encrypted path.

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

BRIEF DESCRIPTION OF THE DRAWINGS

The features disclosed herein are described below with reference to the drawings. The drawings are provided to illustrate embodiments of the inventions described herein and not to limit the scope thereof.

FIG. 1D depicts an example process of secondary content proxy.

DETAILED DESCRIPTION

Overview

Figure 1A:
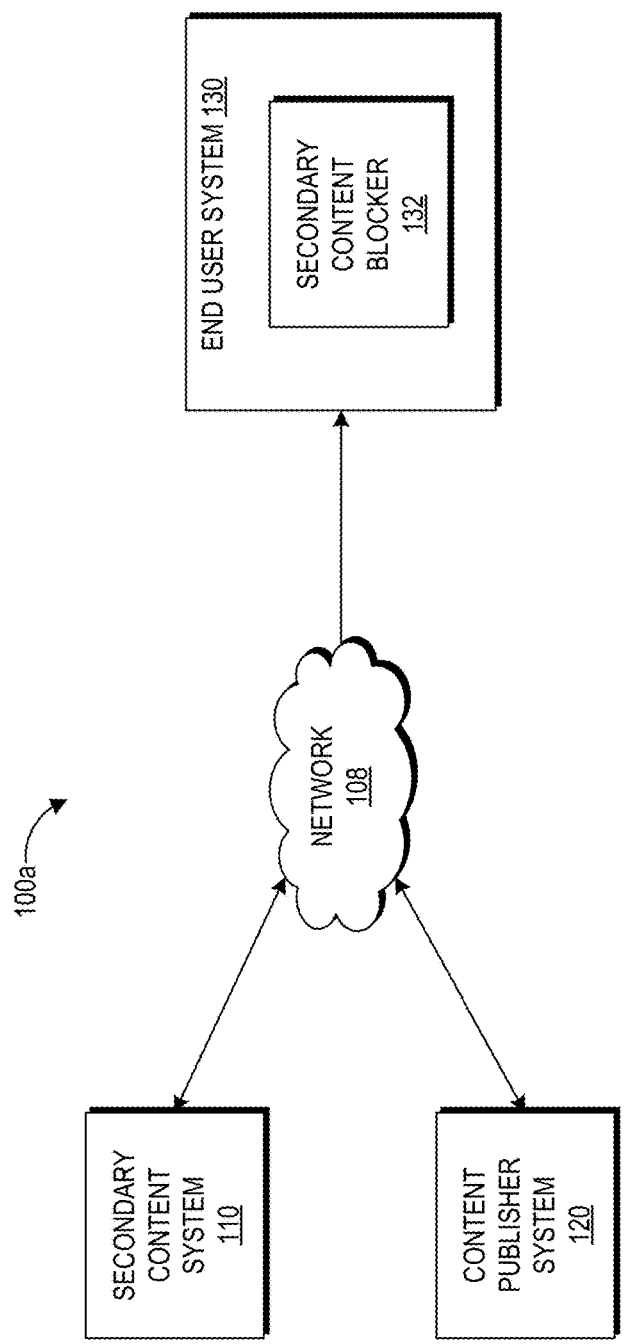
FIG. 1A depicts an example of secondary content blocking technology.

Content publishers often rely on secondary content to support the primary content they deliver to end users.

Therefore, when end users visit a website, the content publishers expect the end users to view not only the primary content but also the secondary content associated with the primary content. However, secondary content blocking technology allows the end users to consume the primary content but blocks the secondary content. As a result, the content publishers often deliver the primary content without any support.

A secondary content blocker typically works by distinguishing between the primary content provided by a content publisher and a secondary content provided by an advertiser based on the characteristics of the secondary content. The characteristics (also referred to as distinguishing characteristics) may include headers, domains, paths, query strings, IP addresses, combinations of the same, or the like. For example, the secondary content blocker can identify an IP address of a server delivering the secondary content or a uniform resource locator (URL) pattern associated with the secondary content. The URL may include a host and a path. The secondary content blocker may look at the characteristics of the URL such as, e.g., the IP address associated with the URL, the clear text of the host, the path, or the combination. The secondary content blocker can match the characteristics against a blacklist. If the characteristics are found on the blacklist, then the secondary content blocker blocks the content from that server or that URL.

Advantageously, in certain embodiments, content publishers can avoid being blocked by employing secondary content proxy techniques disclosed herein. The secondary content proxy may be implemented by a CDN. For example, an edge server of a CDN may serve as a proxy for one or more secondary content servers. During this process, the edge server can replace distinguishing characteristics of a secondary content server such as, e.g., the IP address or domain name, with characteristics associated with the CDN. As a result, the secondary content (which may originate from a server other than the publisher) and the publisher's content (sometimes referred to herein as "primary content") may appear to have the same characteristics to the end user (or to the end user's computing system or software installed thereon, such as a browser or mobile application).

To defeat pattern matching, the edge server can also encrypt a portion of the URL when serving the content to end users. For example, the clear text of the encrypted URL may not follow a pattern recognizable by the secondary content blocker. The path can be decrypted by the edge server when the edge server communicates with the secondary content server to retrieve the secondary content. Therefore, the secondary content blocker may not be able to successfully distinguish secondary content from the primary content the end user is interested in, and can allow the end user to view both the primary content and the secondary content.

In some embodiments, secondary content servers are daisy-chained together such that a request for secondary content from a secondary content server can cause the secondary content server to redirect to another secondary content server. Similar techniques for avoiding the secondary content blocker can also be applied in the context of daisy-chained secondary content servers. For example, an edge server of the CDN can encrypt a portion of the URL to the other secondary content server so that the clear text of the URL does not appear to be associated with secondary content. In certain implementations, the encrypted path associated with the other secondary content server can be embedded back into the content of a web page.

Although the examples herein are described with reference to secondary content, in some implementations, the application of the techniques described herein are not limited to secondary content. Similar techniques can also be used to defeat the blocking of any audio/visual content or content from a website. For example, an end user may specify a type of content or a website that the end user wants to block. The techniques described herein can be used to circumvent the blocking of the type of content or the website.

Examples of Secondary Content Blocking

FIG. 1A depicts an example of secondary content blocking technology. The computing environment 100a in FIG. 1A includes a secondary content system 110, a content publisher system 120, and an end user system 130. The secondary content system 110, the content publisher system 120, and the end user system 130 can communicate with each other via the network 108. The network may be a local area network (LAN), a wide-area network (WAN), the Internet, an intranet, combinations of the same, or the like.

For example, as illustrated by the arrows in FIG. 1A, the secondary content system 110 can deliver secondary content and the content publisher system 120 can deliver primary content (which may include audio/visual content) to the end user system 130. Non-limiting examples of content may include one or more of TV shows, movies, news, music, advertisements, links to advertisements (e.g., links to a server serving the advertisements), links to TV shows, links to movies, links to news, links to music, combinations of the same, or the like. The content may also include an HTML page, a script file (e.g., a JavaScript file), combinations of the same, or the like.

The secondary content system 110 may be implemented on one or more secondary content servers. A secondary content server can store or serve secondary content. The content publisher system 120 can include a Content Management System (CMS). The CMS can include a content management application (CMA) which may be a front-end user interface that allows a user to add, modify and remove content from a website. The CMS can also include a content delivery application (CDA) which can implement the changes by the CMA and update the website accordingly. The CMS may include one or more data storages for storing the audio/visual content. The CMS may be implemented by one or more servers associated with a content publisher. In some situations, a server associated with the content publisher system 120 or the secondary content system 110 may be referred to as an origin server.

The end user system 130 may be part of a user device, such as a personal computer, a laptop, a mobile device, or a tablet, etc. The end user system 130 may include a secondary content blocker 132. The secondary content blocker software may be an add-on for a web application (such as, e.g., a browser) or may be a standalone application. The secondary content blocker can block secondary content from the secondary content server 110 by applying a list of filters. The filters may be based on distinguishing characteristics of the secondary content server 110, such as, e.g., IP address, domain names, path, headers, query strings, etc. For example, a distinguishing characteristic may be a pattern of the URL (e.g., example.com/ads). As another example, the distinguishing characteristic may be the IP address of the secondary content server.

The secondary content blocker 132 may obtain the distinguishing characteristics based on the user's interaction with the content. For example, a user may send a request for the content. The request may be a Hypertext Transfer Protocol (HTTP) request. The secondary content blocker can parse the HTTP request to identify an URL associated with the content. The secondary content blocker 132 can obtain the URL associated with the content, for example, by extracting the path from an HTTP header or an HTTP method (such as the GET request, the HEAD request, etc.). As another example, the secondary content blocker may also obtain the distinguishing characteristics, such as the IP address associated with the secondary content server, for example, from Domain Name Servers (DNS).

The secondary content blocker can maintain a blacklist. The blacklist may include a list of distinguishing characteristics that are likely associated with the presence of secondary content. For example, the blacklist may include a list of URL patterns (such as, e.g., "/ad1") that are likely associated with secondary content. Additionally or alternatively, the blacklist may include a list of secondary content servers. For example, the blacklist may include a list of domain names or IP addresses associated with secondary content servers. The secondary content blocker 132 can determine whether a secondary content server or a distinguishing characteristic should be on the blacklist based on historical data collected by the user of the end user system 130. For example, the user of the end user system 132 can indicate whether an item on a website is secondary content. The secondary content blocker can record the user's indication and identify common characteristics among the secondary content identified by the user. The secondary content blocker 132 can also make the determination based on data collected from a group of users. For example, if a large number of users in the group identify an item on the website as secondary content, the secondary content blocker 132 can determine the characteristics associated with the item and add the characteristic to the blacklist.

If the secondary content blocker 132 determines that content's characteristics match an item on the blacklist, block the communications with the server associated with the content. For example, the secondary content blocker 132 can block the request to retrieve the content from the server if the server's characteristic or if the server itself is on the blacklist. Additionally or alternatively, the secondary content blocker 132 can block the content received from server if the content's characteristic or the server associated with the content is on the blacklist.

With reference to FIG. 1A, the URL associated with the secondary content system 110 may be "adserver1.com" while the URL associated with the content publisher system 120 may be "publisher.content.com". The end user may initially request a primary content from the content publisher system 120. However, the primary content may include a link to secondary content. Therefore, in response to the end user's request, the end user system 130 may need to make two requests: one for the secondary content and one for the primary content. The secondary content blocker 132 can determine that the link of the secondary content is on the blacklist. Accordingly, the secondary content blocker 132 may block the request so that the request for the secondary content will not be sent. As another example, the end user system 130 may receive the secondary content and the primary content in response to the end user's request for the primary content. The secondary content blocker 132 can block the secondary content such that it will not be loaded or displayed to the user.

Although the secondary content blocker 132 is shown to be part of the client system 130, at least a portion of the secondary content blocker 132 may be implemented by another computing device. For example, the secondary content blocker 132 may be part of an organization's computing system (such as a company's server).

Secondary Content Proxy Examples

Figure 1B:
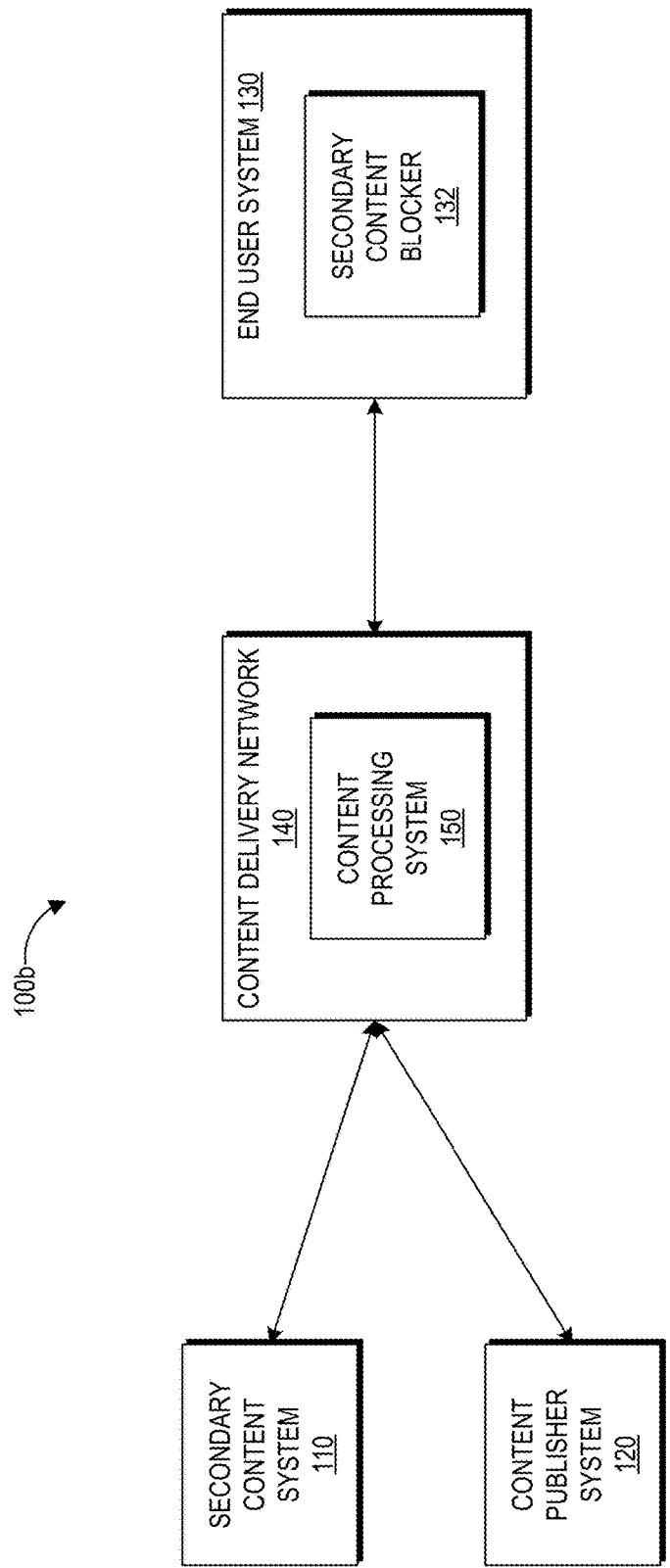
FIG. 1B depicts an example of providing a secondary content proxy with a CDN.

FIG. 1B depicts an example of providing a secondary content proxy with a CDN. The computing environment 100b in FIG. 1B can include a secondary content system 110, a content publisher system 120, and an end user system 130. In the example computing environment 100b, the secondary content system 110 and the content publisher system 120 can communicate with a content delivery network (CDN) 140 through a network, such as the network 108 (not shown in FIG. 1B). The CDN 140 can deliver the primary content and secondary content to the end user system 130 via the network. The CDN 140 can include one or more servers located in different geographical locations (such as, e.g., edge servers). Edge servers can represent points of presence (PoPs) that may be geographically closer to an end user's computer than the publisher's servers. Thus, a publisher can typically serve its content from an edge server faster than from its own servers. An edge server can communicate with end users, secondary content servers, a publisher's CMS, other edge servers, other computing systems, and so on. In some embodiments, the CDN 140 can include the content publisher system 120, the secondary content system 110, alone or in combination.

The CDN 140 can serve as a proxy for the secondary content system 110. When communicating with an end user system 130, the CDN 140 can replace the distinguishing characteristics of the secondary content server with some of the characteristics of the CDN 140 or the content publisher system 120. As a result, the secondary content blocker may choose to block some or all content coming from the CDN 140 or pass all content (including the secondary content) to the end user because the secondary content blocker 132 cannot distinguish whether the content and secondary content are coming from a secondary content server or from the CDN 140 (or from the content publisher's system 120).

For example, an edge server of the CDN 140 may receive a request to retrieve a webpage from the end user system 130. The request may be an HTTP request. The request may include a URL to the webpage. The CDN can parse the request to identify a request host and a request path. In this example, the request host may be a server associated with the content publisher system while the request path may be a file location of the webpage. In some embodiments, the webpage includes a link to secondary content. The link may be a URL associated with a secondary content server. The CDN 140 can modify the URL associated with the secondary content server to remove characteristics indicating the presence of secondary content. For example, the CDN 140 can encrypt at least a portion of the URL (such as, e.g., a path in the URL, a host in the URL, a query string in the URL, alone or in combination). The CDN 140 may perform the encryption such that the encrypted URL does not follow a recognizable pattern. The portion of the URL may be encrypted and decrypted using any available encryption and decryption techniques, such as e.g., symmetric encryption, public key encryption, rolling substitution cipher technology, combinations of the same, or the like. The encryption technique may change over time, e.g., by changing the encryption algorithm, encryption keys, or both. For example, the CDN may rotate or generate new encryption keys from time to time.

Additionally or alternatively, the CDN 140 can alter a portion of the clear text of the URL. For example, the CDN 140 can change the host of the URL to indicate the CDN edge server or to the content publisher's system instead of indicating the secondary content server. In some embodiments, the CDN may replace an unmodified URL in the webpage with the encrypted URL or the altered URL such that the secondary content blocker 132 will not recognize the presence of the secondary content based on the clear text of the URL when the end user system 130 requests the content using the URL.

Because the secondary content blocker 132 cannot, in some embodiments, identify the distinguishing characteristics of secondary content due to the modifications by the CDN 140, the secondary content blocker 132 may block or allow some or all content from the CDN 140, which may include audio/visual content the end user is interested in and the secondary content. If the secondary content blocker 132 allows all content from the CDN 140, the end user system 130 may send a request to the CDN 140 requesting the content associated with the modified link. The CDN 140 can decrypt the path, communicate with the origin servers, and retrieve content from the origin servers using the decrypted path. In some embodiments, this decrypted path is used only for communications between the origin servers and the CDN 140.

The CDN 140 may include a content processing system 150. The content processing system 150 may be implemented on one or more CDN edge servers. The content processing system 150 can remove the distinguishing characteristics of secondary content served by the secondary content system 110. For example, the content processing system 150 can modify the URL of the content as seen by the end user system 130 or encrypt a portion of the URL. The content processing system 150 can also decrypt the modified URL and retrieve the secondary content from the secondary content system 110 based on the decrypted URL. Details of the content processing system 150 are described in FIG. 1C.

Examples of a Content Processing System

Figure 1C:
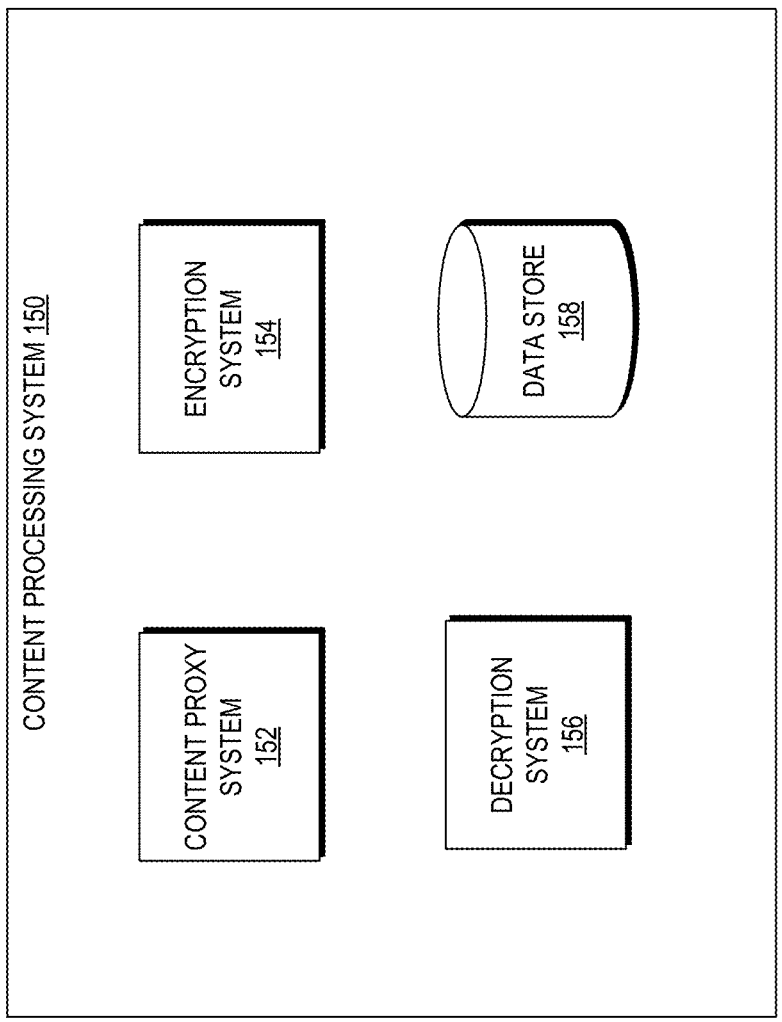
FIG. 1C depicts an example of a content processing system.

FIG. 1C depicts an example of a content processing system. The content processing system 150 may be part of the CDN 140. For example, the content processing system may be implemented on one or more edge server of the CDN 140. Additionally or alternatively, the content processing system 150 may be part of the content publisher system 120.

The content processing system 150 in FIG. 1C includes a content proxy system 152, an encryption system 154, a decryption system 156, and a data store 158. In some embodiments, the content processing system 150 includes fewer or more systems as shown in FIG. 1C. In certain implementations, one or more systems of the content processing system 150 are part of another system. For example, the encryption system 154 and decryption system 156 may be part of the same system or be part of the content proxy system 152.

The content proxy system 152 can be configured to communicate with the end user system 130 and with the content publisher system 120. For example, the content proxy system 152 can parse a request for content received from the end user system 130, retrieve the content from the content publisher system 120, and deliver the content to the end user system 130. In some embodiments, the content proxy system 152 acts as a proxy for an origin server. For example, the content proxy system 152 may serve as the proxy for secondary content server or a content publisher's server.

The encryption system 154 may be configured to encrypt a portion of the URL associated with the content. For example, the encryption system 154 can encrypt the URL path or the query string in the URL such that the encrypted portion (alone or in combination with the unencrypted portion) does not match a pattern on a secondary content blocker's blacklist. The encryption system 154 can also modify the hostname in the URL. For example, the encryption system 154 can change the host from a secondary content server to an edge server or a server associated with the content publisher system 120. The encrypted path may be communicated to the end user's system 130. The end user system 130 can incorporate the encrypted path and the modified host in an HTTP request for the content.

The decryption system 156 can decrypt an end user's request for content. For example, the decryption system 156 can decrypt the path in the URL and substitute the host from the modified host (such as, e.g., the edge server) to the origin server. The content proxy system 152 can use the decrypted path and communicate with the true host to retrieve the content. In some implementations, the modified URL is used for communications between the end user system 130 and the content proxy system 152 while the unmodified URL is used for communications between the content proxy system 152 and the origin server.

The data store 158 may be configured to store a whitelist. The whitelist may be used for encryption and/or decryption. For example, the whitelist may include pairs of modified host and the origin server. The whitelist may also include a mapping between an origin server and a type of modification used for URL (such as e.g., type of encryption algorithms, which portion of the URL is modified, etc.). In some embodiments, the data store 158 may store one or more encryption and decryption algorithms.

Example Process of Secondary Content Proxy

FIG. 1D depicts an example process of a secondary content proxy. The example process 100d may be implemented in the computing environments 100b and 200b as described herein. For example, one or more edge servers of the CDN 140 may serve as a proxy for an origin server. In some embodiments, secondary content can include images, video, an advertisement (or "ad"), combinations of the same, or the like. Thus, for example, secondary content blocking can include ad blocking, and secondary content servers can be ad servers.

At state (1), the proxy can send a request to an origin server requesting content such as a Hyper Text Markup Language (HTML) page which may be part of a website hosted by the origin server. In response to the request, the origin server can deliver the HTML page which may include a link to secondary content. For example, the link may be an URL to the secondary content server. An example link to the secondary content server in the HTML page may be expressed by the following code:

<script src=https://cdn.example.com/ads.js></script>

The link may include a host and a path. The host may be used to identify the secondary content server while the path may be used to identify the file location of the second content. In this example, the host may be "cdn.example.com" while the path may be "ads.js".

At state (2), the proxy can parse and modify the link associated with the secondary content server. The proxy can identify the host and the path through the parsing process. The proxy can replace the host indicating the secondary content server with a host indicating the proxy server. The proxy can also replace the path of a secondary content file with an encrypted path. After the modification of the link, the proxy can deliver the modified link to a client (such as, e.g., an end user system). For example, the proxy can modify the host such that the host may be changed from a domain associated with an original server (e.g., "cdn.example.com")

to a domain associated with a proxy server (e.g., "example-.hwcdn.net"). Additionally or alternatively, the path may be encrypted. The encrypted path may not include distinguishing characteristics associated with secondary content. For example, the path "ads.js" may be encrypted to become "zbp.fn". In this example, the proxy uses a rolling substitution cipher technology for encryption, although other encryption methods (including, e.g., one time pad among others) could also be used. Accordingly, the example link to the secondary content server as seen by the client system may become the following HTML code:

<script src=https://example.hwcdn.net/zbp.fn></script>

At state (3), a client such as, e.g., an end user system can interpret the HTML page and send a request to retrieve content (such as the secondary content) using the encrypted path. Because the host as seen by the client is associated with the CDN, the client may determine that the host is not on a blacklist for blocking. As another example, because the path (as encrypted) does not follow a recognizable pattern associated with secondary content, the client system (e.g., a browser or mobile application thereof) may decide not to block this link.

Accordingly, the client may send the following HTTP request to the proxy to retrieve the content associate with the link:

GET/zbp.fn HTTP/1.1
Host: example.hwcdn.net

At state (4), the proxy can decrypt the encrypted path as received from the client. For example, the proxy may decrypt the encrypted path based on the encryption algorithm used. In certain implementations, the proxy keeps a whitelist which may include a lookup table. The lookup table may include pairs of encrypted and decrypted paths. In this example, the proxy can decrypt the path "zbp.fn" as received from the client to "ads.js". The proxy can also substitute the host which indicates the proxy server to the host indicating the origin server. In the same example, the host may be changed from "example.hwcdn.net" to "cdn.example.com". The lookup table may also include a mapping which associates the domain name (or the IP address) of the proxy server with the domain name (or IP address) of the origin server.

Accordingly, the proxy can use the decrypted path to request the content from the origin server. For example, the proxy can send the following HTTP request to the origin server:

GET/ads.js HTTP/1.1
Host: cdn.example.com

The same process can be applied again when the client requests content in a new round.

Daisy Chaining Examples

Sometimes an origin server may not store all the content for a webpage. For example, a secondary content server or a content publisher may not store all the secondary content on the webpage. In particular, when the secondary content are customized or targeted to an end user, the origin server may not store all possible options of the customized/targeted advertising. Rather, the origin server can refer the request for content to another server. This process may sometimes be referred to as daisy chaining.

Figure 2A:
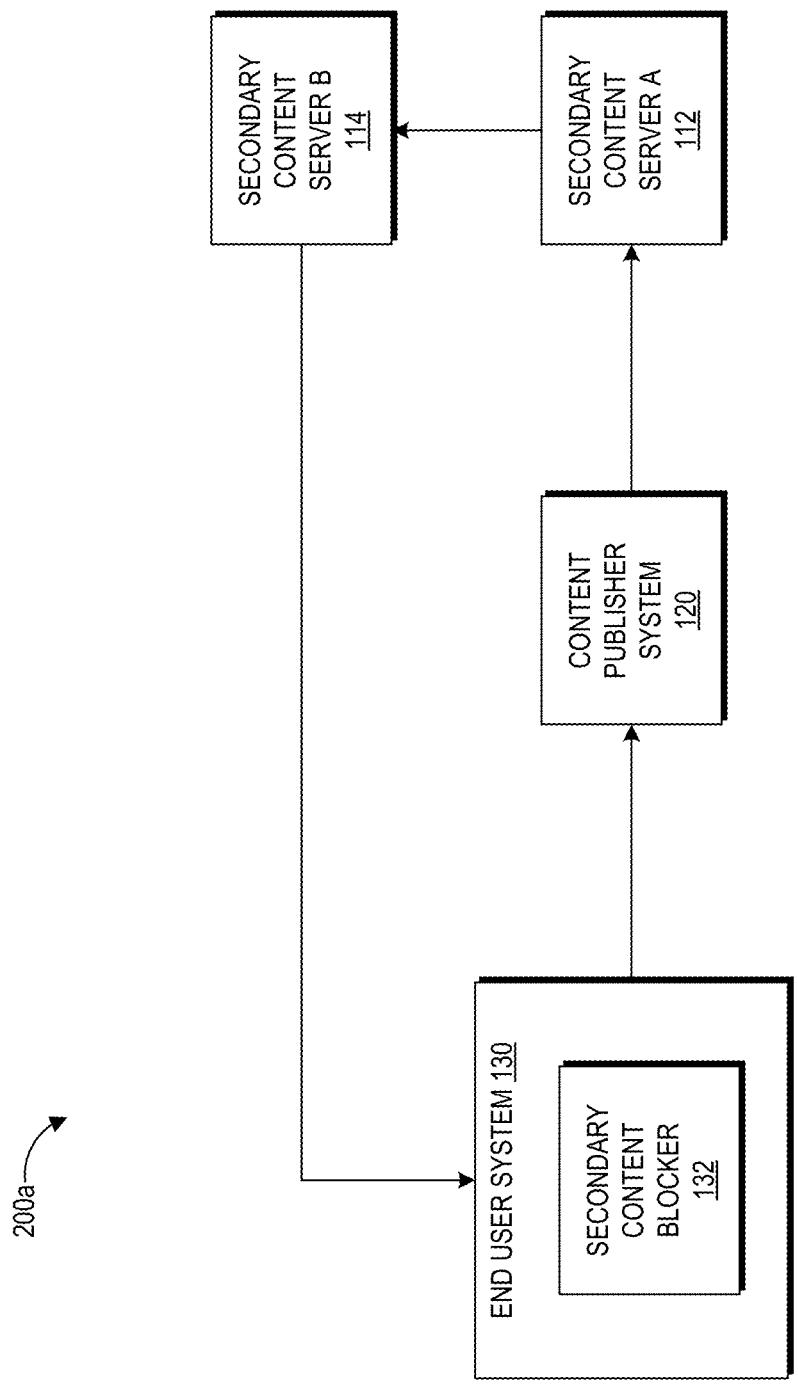
FIG. 2A depicts an example of secondary content blocking in the context of daisy chaining secondary content server requests.

FIG. 2A depicts an example of secondary content blocking in the context of daisy chaining secondary content server requests. The example computing environment of 200a includes an end user system 130 which may include a secondary content blocker 132, a content publisher system 120, a secondary content server A 112, and a secondary content server B 114. In this example computing environment, the content publisher system 120 may refer to secondary content server A 112 to retrieve secondary content associated with content. However, the secondary content server A 112 may not have one or more secondary content items requested by the content publisher system 120. Therefore, the secondary content server A 112 may communicate with or redirect the request to secondary content server B 114 for retrieving the one or more secondary content items. The secondary content server A 112, secondary content server B 114, alone or in combination may be part of the secondary content system 110 described in FIGS. 1A and 1B.

In FIG. 2A, the end user system 130 can request primary content from the content publisher 120. The content publisher system 120 may or may not be a part of the CDN 140. As described above with reference to FIG. 1A, the primary content may include one or more links to secondary content. The secondary content may be customized based on one or more characteristics of the end user system 130 such as e.g., geographical locations, cookie data, or types of the content requested, etc. Any secondary content customizations can be employed for the embodiments described herein.

The content publisher system 120 can communicate with the secondary content server A 112 and request secondary content. Sometimes, the secondary content server A 112 may not have the secondary content requested. The secondary content server A 112 may communicate with the secondary content server B 114 to retrieve the secondary content. In some embodiments, the secondary content server A 112 may redirect the content publisher system 120 or the end user system 130 to communicate with the secondary content server B 114 to get the secondary content.

However, the secondary content blocker 132 of the end user system 130 may recognize that the secondary content server B 114 is on the blacklist for blocking. For example, the secondary content server B's 114 URL may include distinguishing characteristics indicating that the secondary content server B 114 is likely associated with a source of unwanted content. As a result, the secondary content blocker 132 may block the request to the secondary content server B 114 or block the content received from the secondary content server B 114.

Figure 2B:
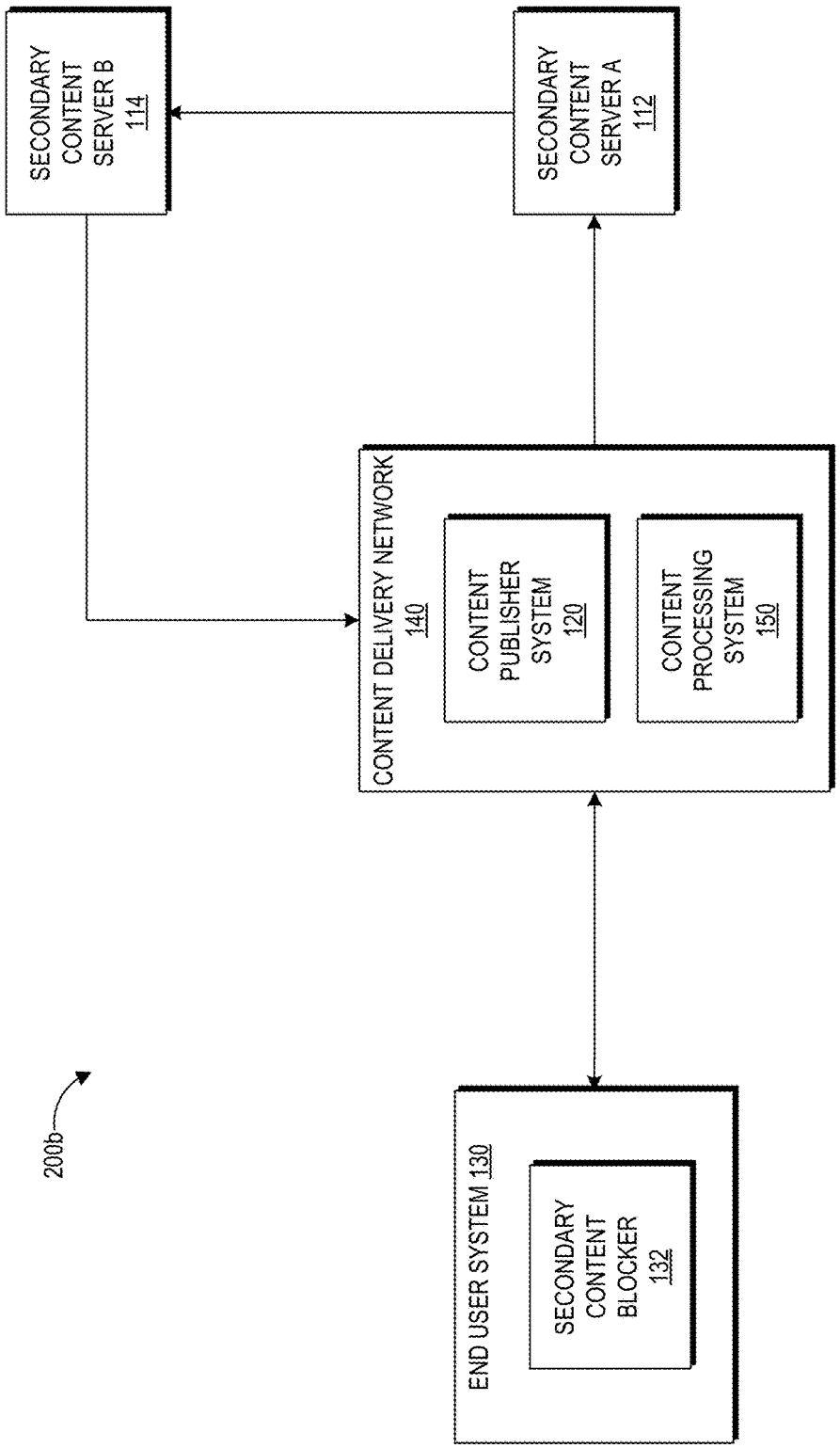
FIG. 2B depicts an example of secondary content proxy in the context of daisy chaining.

FIG. 2B depicts an example computing environment 200b including a secondary content proxy in the context of daisy chaining. The example computing environment 200b includes an end user system 130 which may include a secondary content blocker 132, a CDN 140, a secondary content server A 112, and a secondary content server B 114. The CDN 140 may include a content publisher system 120 and a content processing system 150. In certain embodiments, the content publisher system 120 is not part of the CDN 140. For example, the content publisher system 120 may be associated with its own server and may serve as an origin server.

In the example computing environment 200b, the client 130 can send a request for a webpage to an edge server of the CDN 140. The webpage may include content such as, e.g., an audio file, a video file, secondary content, html page, JavaScript, etc. The edge server may store some of the content on the webpage. For example, the edge server may obtain the audio/visual content from the content publisher system 120. However, the edge server or the content publisher system 120 may not have all the secondary content on the webpage. Accordingly, the edge server of the CDN 140 may request the secondary content from another system (such as, e.g., the secondary content sever A 112).

If the secondary content server A 112 has a requested secondary content, the secondary content server A 112 can return the secondary content to the edge server for delivery to the end user system 130. If the secondary content server A 112 does not have the secondary content or only has a portion of the secondary content, the secondary content server A 112 can redirect the edge server to another server such as the secondary content server B to retrieve the content. Upon receiving the request from the edge server, the secondary content server B can return the missing secondary content or the missing portion of the secondary content to the edge server.

As described with reference to FIG. 2A, the secondary content blocker 132 of the end user system 130 may know that the secondary content server B 114 should be blocked. To avoid the content from the secondary content server B 114 or the request to the secondary content server B 114 being blocked, an edge server (or a server associated with the content publisher system 120) may act as a proxy and modify distinguishing characteristics of the secondary content server B 114. For example, a content processing system 150 of the content delivery system 140 may modify the URL to the secondary content server B 114. It can change the host of the URL from the secondary content server B 114 to the CDN 140 (or the content publisher system 120). It can also encrypt the path to the secondary content such that clear text of the path communicated to the client 130 does not follow a known pattern or does not match a pattern on the blacklist of the secondary content blocker 132.

The CDN 140, when delivering the webpage, can also deliver the modified URL to the end user system 130. The end user system 130 can parse the modified URL and send a request (such as, e.g., an HTTP request) to the CDN 140. The request may include information in the modified URL. The CDN may decrypt the request and communicate with the secondary content server B 114 to retrieve the secondary content. However, in some embodiments, when the CDN 140 returns the secondary content to the end user system 130 the URL associated with the secondary content is seen to be the modified URL. Advantageously, in some embodiments, this technique can prevent the secondary content blocker 132 from blocking the secondary content. For example, the CDN 140 may return the modified URL together with the content in response to a request from the end user system 130 to retrieve the content. The request from the end user system may use the modified URL. As another example, when the secondary content server A 112 redirects the CDN 140 to the secondary content server B 114, the secondary content server B 114 can return the content to the CDN 140. The CDN 140 can associate the modified URL with the content and deliver the content to the end user system 130. When the end user system 130 receives the content, the URL of the content may be the modified URL. Because the distinguishing characteristics of the secondary content server have been removed in this embodiment, the secondary content blocker may not be able to separate the secondary content server from the content publisher. As a result, the secondary content blocker may allow the content, including the secondary content, to pass through to the client because the path to the content publisher and/or the encrypted path do not match an entry on the secondary content blocker's blacklist.

The techniques for removing distinguishing characteristics of the secondary content server can also be applied to the links embedded in the content. For example, the content publisher can encrypt links in the content and replace the original links with the encrypted links in the content.

Although the examples herein are described with reference to two secondary content servers (e.g., adserver1.com and adserver2.com), multiple secondary content servers (three, four five, six, etc.) may be involved in this process. It should also be noted that there may be multiple links in a content item. The links can point to different secondary content servers and/or content publishers. Each link can be associated with one or more secondary content. A secondary content server may be able to return the content associated with some of the links and point to other servers to return the content associated with the rest of the links. The secondary content server may also point to other servers to return content associated with all of the links. In some embodiments, the content publisher system 120 is configured to modify and decrypt the link associated with a secondary content server.

Example Process of Secondary Content Blocking

Figure 3:
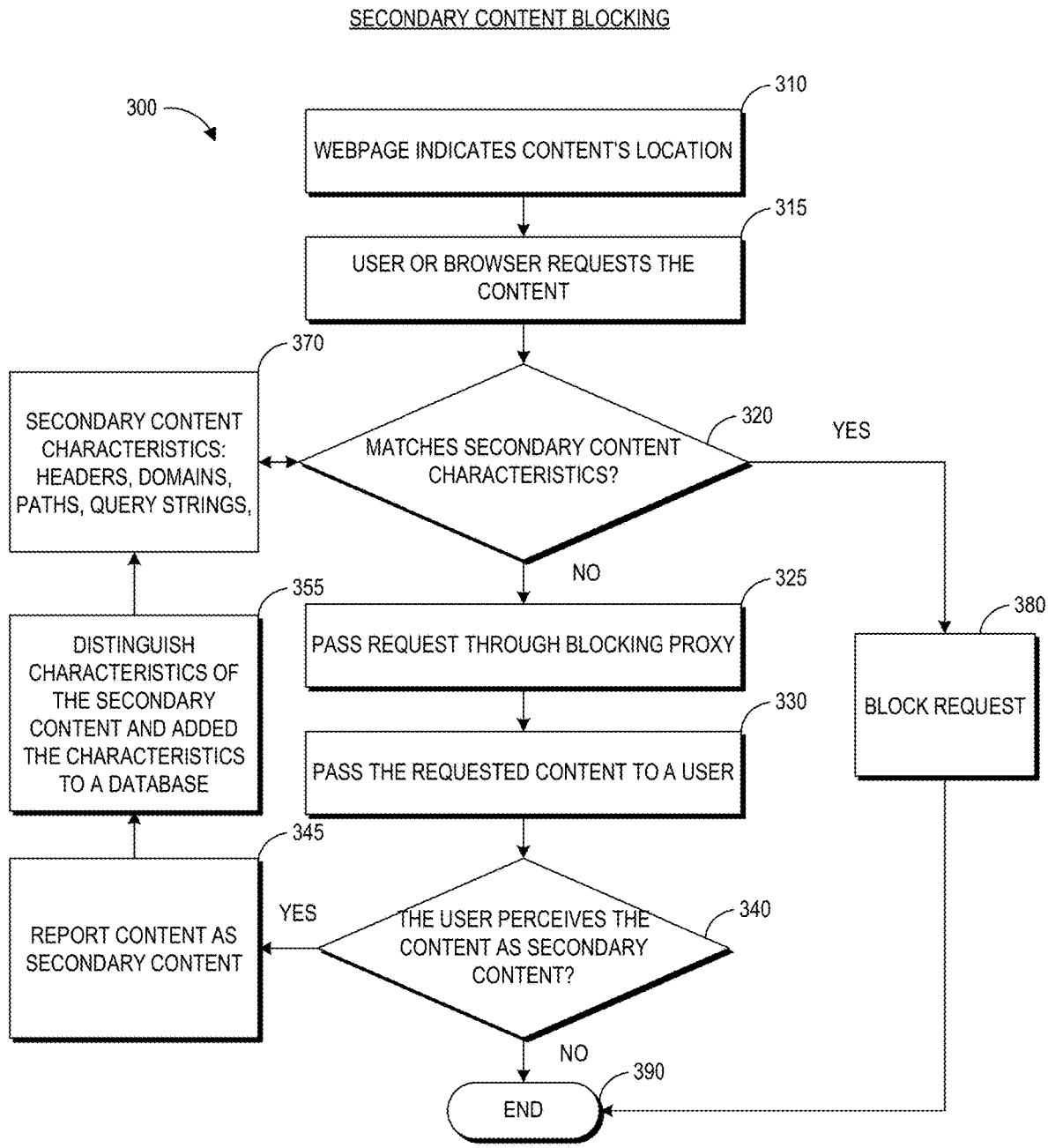
FIG. 3 depicts an example of a secondary content blocking process.

FIG. 3 depicts an example of a secondary content blocking process. The example process 300 shown in FIG. 3 may be performed by the secondary content blocker 132. The secondary content blocker 132 can communicate with another computing system (such as a data store or a server) to determine whether a request includes secondary content. For example, the secondary content block 132 can determine whether the pattern of an URL matches the pattern of secondary content stored in a data store.

As shown in block 310, a webpage can indicate a location of the content. The location may be the URL of the content or other identifiers indicating where to retrieve the content. The location may be received by an end user system as part of another content (such as, e.g., as part of the audio/visual content or as part of the webpage).

At block 315, the user can make a request to retrieve the content. The secondary content blocker, at block 320, can determine the characteristics of the content. For example, the secondary content blocker can determine whether the characteristics of the content match one or more characteristics of secondary content. The secondary content blocker may make this determination by comparing the characteristics of the requested content with distinguishing characteristics on a blacklist. The characteristics can include, for example, headers, domains, paths, query strings, IP addresses, combinations of the same, or the like, as shown in block 370.

If the requested content matches one or more characteristics of the secondary content, then the request is blocked at block 380 and the transaction completes at block 390.

If the secondary content blocker determines that the requested content is not secondary content at block 320, the secondary content blocker will not block the requested content and pass the request through a blocking proxy 325. The blocking proxy 325 may be part of the secondary content blocker (e.g., secondary content block 132) which can apply a list of filters for determining whether to allow an end user to receive certain content. For example, the filters may determine whether the content is malicious or whether the content is secondary content.

At block 330, the requested content is passed to the user. At block 340, the user can mark whether the requested content is secondary content. If the secondary content blocker has correctly determined that the requested content is not secondary content (because the user did not mark the content), the process completes at block 390.

But if the secondary content blocker fails to determine the requested content is secondary content because the user has marked the content as secondary content, the content may be reported as secondary content at block 345. The secondary content blocker can, at block 355, analyze the content and determine distinguishing characteristics of the content. The secondary content blocker can also add the distinguishing characteristics to the data storage. As indicated in block 370, the distinguishing characteristics of secondary content may be determined based on headers, domains, paths, query strings, etc. The next time, when the same content is requested, the secondary content blocker can block the content based on the distinguishing characteristics stored.

Example Processes of Secondary Content Blocking with Secondary Content Proxy

Figure 4:
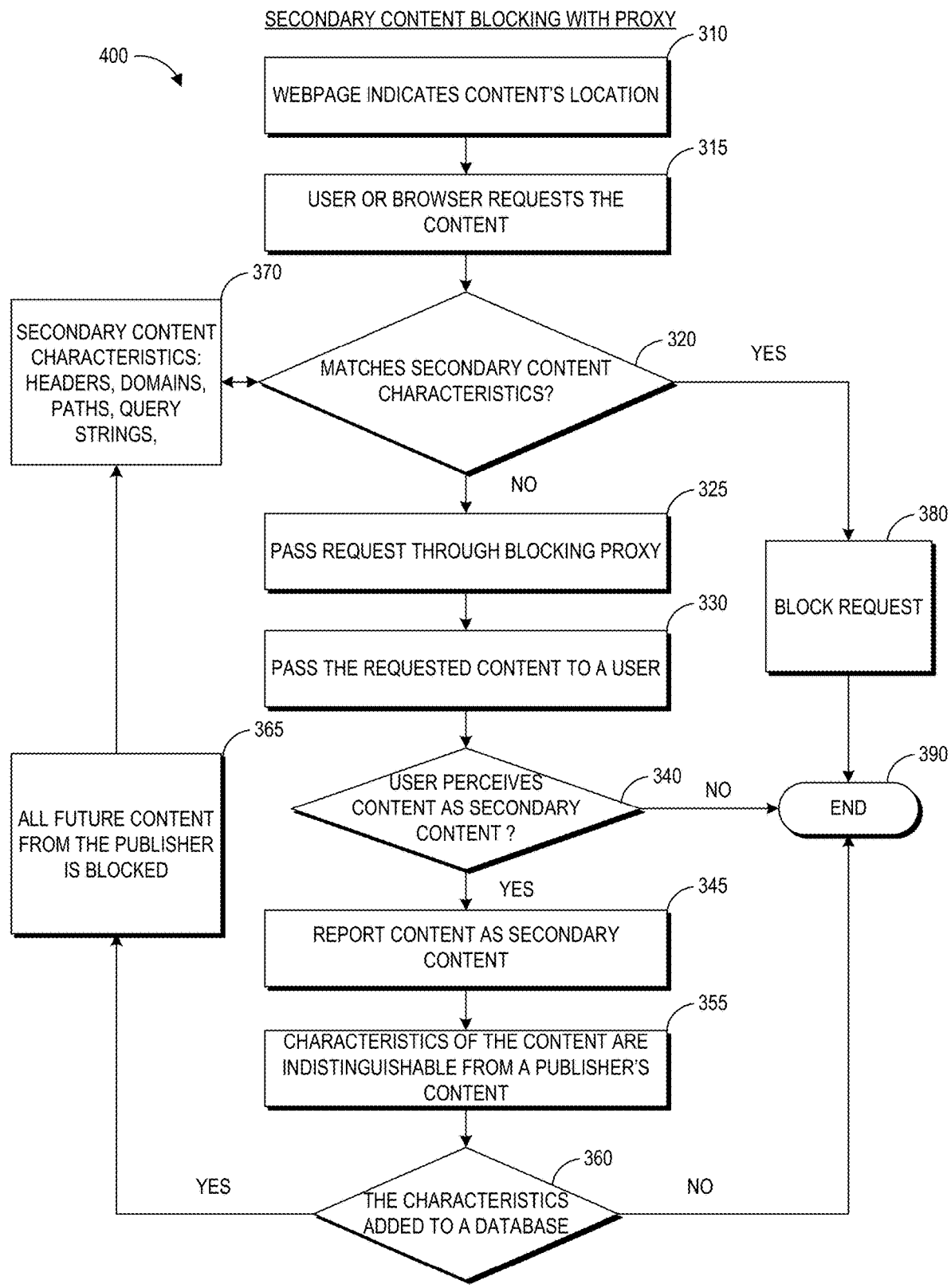
FIG. 4 depicts an example of a secondary content blocking process where the secondary content is indistinguishable from a primary content delivered by a content publisher.

FIG. 4 depicts an example of a secondary content blocking process where the secondary content is indistinguishable from a primary content delivered by a content publisher. The process 400 may be performed by the secondary content blocker on an end user system. Similar to the descriptions with respect to FIG. 3, a secondary content blocker filters secondary content based on one or more distinguishing characteristics of the secondary content. In FIG. 4, the descriptions involving blocks 310, 315, 320, 325, 330, 340, 345, 370, 380, and 390 are the same as those in FIG. 3. However, at block 350 in FIG. 4, the characteristics of secondary content are indistinguishable from the primary content that the end user is interested in viewing (e.g., movies, TV shows, and news from a content publisher).

As discussed with reference to FIGS. 1B, 2B, and 5, the edge server of a CDN can serve as a proxy for a secondary content server and for scrubbing distinguishing characteristics of the secondary content delivered by the secondary content server. For example, an edge server of the CDN can encrypt a portion of an URL associated with the secondary content server when communicating with the end user system (see e.g., end user system in FIGS. 1B and 2B). The encrypted portion may not follow a known pattern that is associated with secondary content. Because the secondary content blocker cannot find the pattern in the blacklist, the secondary content blocker will allow the requested content to be delivered to the user or block all content from the CDN or the content publisher. If the secondary content blocker allows a content to be passed to the user, the user may report to the secondary content blocker that the requested content contains secondary content at block 345.

The secondary content blocker can determine the characteristics of the content at block 355 in FIG. 4. However, because the characteristics of the content marked as secondary content may be similar to the characteristics of the audio/visual content from the content publisher. If the secondary content blocker does not add the characteristics of the content to a database at block 360, the process ends at block 390. But if the secondary content blocker decides to label the content as secondary content as shown at block 360, the secondary content blocker will add the characteristics common to both the secondary content and the audio/visual content from the content publisher (which the end user is interested in) to the blacklist. Accordingly, at block 365, the secondary content blocker will block all contents (secondary content and movies, etc.) having the stored characteristics from that publisher. As a result, the end user may need to disable the secondary content blocker to view the audio/visual content he is interested in.

Example Process of Secondary Content Proxy

Figures 1, 5:
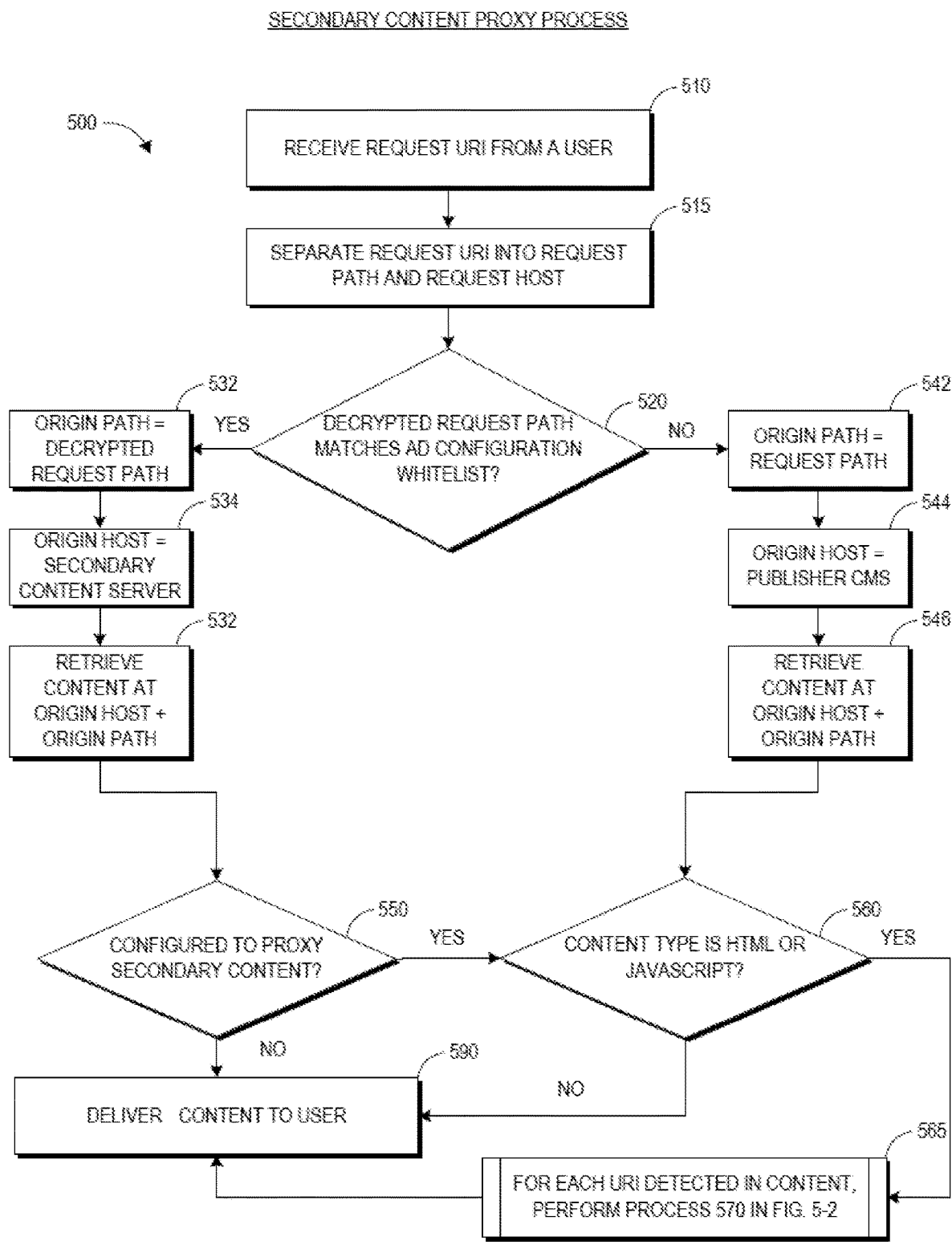
FIG. 5 (shown as two separate drawings, FIGS. 5-1 and 5-2) depicts an example process of avoiding secondary content blocking.
Figures 2, 5:
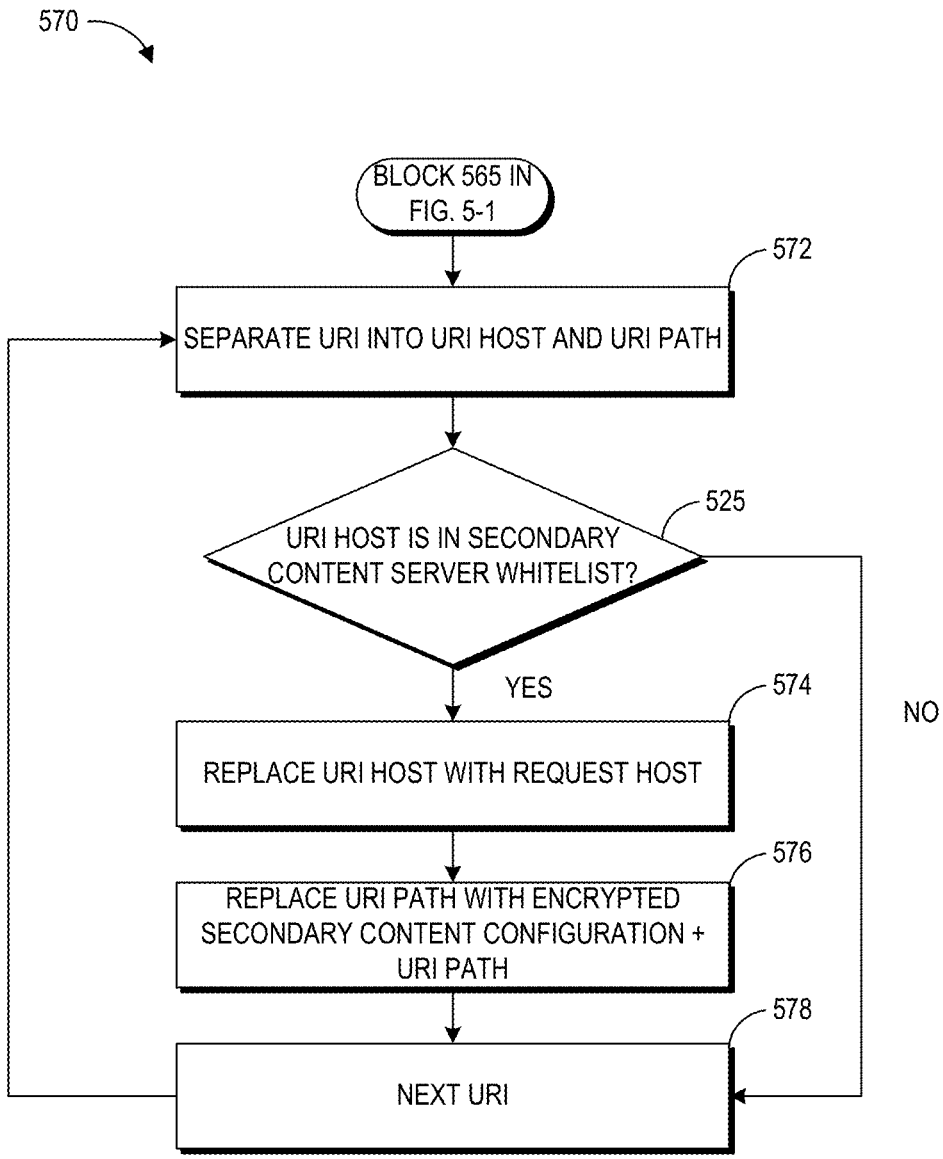

FIG. 5 (shown as two separate drawings, FIGS. 5-1 and 5-2) depicts an example process of avoiding secondary content blocking. The example process 500 may be implemented by a variety of computing systems such as, e.g., a CDN edge server, a content publisher, combinations of the same, or the like, or any of the computing systems described above. For example, a CDN edge server may be in communication with one or more origin servers (see e.g., origin server described above with respect to FIG. 1A) to retrieve the primary content and the secondary content. The CDN edge server may also be in communication with one or more end user systems to deliver content to those systems.

At block 510, the server can receive a request from an end user system or a user agent such as e.g., a browser. The request may include a Uniform Resource Identifier (URI). The URI can identify a web page, which may include content, such as secondary content or primary content. The content may also include one or more URIs. The terms "URI" and "URL" are used herein interchangeably.

At block 515, the server separates the request URI into a request path and a request host. It decrypts the request path to determine if the decrypted request path is on a whitelist as shown in block 520. The whitelist, like the blacklist, can include one or more characteristics of a secondary content server. The whitelist may be maintained by the CDN (such as, e.g., the content processing system 150 or an edge server). The edge server can also communicate with a data store (such as e.g. the data store 158 in FIG. 1C) that stores the whitelist to determine whether the decrypted path is on the whitelist. In some embodiments, the whitelist may include a look-up table which includes pairs of encrypted and decrypted paths or pairs of modified and unmodified hosts, or a combination. As discussed in reference to FIGS. 1B and 2B, the server may use any of a variety of encryption and decryption techniques for the modifying the URI.

If the decrypted request path does not match an item on the whitelist, the URI may not have been encrypted yet. In these situations, the server can set the origin path as the request path (at block 542) and the origin host may point to a content publisher (such as e.g., the CMS) (at block 544). At block 546, the server can retrieve the content using request path as the origin path and the publisher's CMS as the origin host.

If the decrypted request path matches a secondary content configuration in the whitelist, the URI received from the end user system has already been decrypted. Accordingly the origin path may be updated to the decrypted request path (block 532) and the origin host may be updated to the secondary content server (block 534). As indicated in block 536, the content may be retrieved from the secondary content server using the decrypted request path as the origin path and the secondary content server as the origin host.

At block 550, whether the server is configured for secondary content proxy is determined. If the server is not configured for secondary content proxy, the server sends the retrieved content to the end user as shown in block 590. If the server is configured for secondary content proxy, at block 560, the server further determines whether the types of the contents on the web page include HTML, JavaScript or other types, which can incorporate a URI to another location. If the content does not include a URI to another location, then the server delivers the content to the user at block 590.

If the content includes one or more URIs, the server can perform the block 565 where for each URI detected in the content, the server can iteratively perform the process 570. At block 572 of the process 570, the server can separate the URI into a URI host and a URI path. The server can use the same method for parsing the URI as in block 515. At block 525, the server determines whether the URI host is on the whitelist. If the URI host is not on the whitelist, the server analyzes the next URI as shown in block 578.

If the URI host is on the whitelist, then at blocks 574 and 576 the URI host is replaced with the request host and the URI path is replaced with an encrypted path. The path may be encrypted with a variety of techniques as mentioned herein. The modified path can be injected back to the body of the content.

The server repeats the process 570 for each URI detected in the content. The server can deliver the content to the user, where the content may include one or more URIs modified using the process 570.

Although some of the examples herein are described using CDN edge server, it should be noted that the implementations should not be limited to the CDN edge server. Other computer and/or network systems may also be used to implement the various processes described herein. For example, the content publisher system may be used to perform one or more functions of the CDN edge server.

Terminology

The features described herein can be implemented together with any subcombination of the features described in either of the following patents, U.S. Pat. No. 7,962,580, titled "Content Delivery Network," filed Dec. 12, 2008, and U.S. Pat. No. 8,489,731, titled "Content Delivery Network with Customized Tracking of Delivery Data," filed Aug. 20, 2009, the disclosures of which are hereby incorporated by reference in their entirety. For instance, the CDN described herein can be implemented using any of the CDN features described in these patents.

Many other variations than those described herein will be apparent from this disclosure. For example, depending on the embodiment, certain acts, events, or functions of any of the algorithms described herein can be performed in a different sequence, added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for using cryptography to deliver content in a content delivery network (CDN), the system comprising:
 a data store configured to store information associated with modifying at least a portion of a uniform resource locator (URL) that addresses content, wherein the URL comprises a host and a path, and wherein the content comprises a link to secondary content;
 a network interface configured to communicate with an end user system and an origin server;
 a content processing system comprising a hardware processor configured to:
  receive a request from the end user system to retrieve the content, wherein the request comprises the URL of the content in an obfuscated form that obfuscates an identity of the content from a content blocker of the end user system;
  identify the host and the path of the URL, wherein the host indicates the content processing system;
  perform a decryption on at least a portion of the path of the URL to generate a decrypted path;
  determine whether the decrypted path is associated with a secondary content whitelist;
  in response to a determination that the decrypted path is associated with the secondary content whitelist, decrypt the link to the secondary content to identify a secondary content server hosting the secondary content and a file path of the secondary content;
  modify the URL to obtain a modified URL by changing the host to indicate the secondary content server and changing the path to be the decrypted path;
  communicate with the secondary content server to retrieve the secondary content at the file path, wherein the origin server comprises the secondary content server and is separate from the content delivery network,
  receive the secondary content associated with the file path, and
  communicate the secondary content to the end user system.

2. The system of claim 1, wherein the content delivery network (CDN) comprises an edge server and at least a portion of the content processing system is executed by the edge server.

3. The system of claim 1, wherein the origin server further comprises a content publisher server.

4. The system of claim 1, wherein the content further comprises one or more of the following: audio content, visual content, or a webpage.

5. The system of claim 1, wherein to perform decryption on at least a portion of the path of the URL to generate a decrypted path, the hardware processor is configured to decrypt a query string in the URL.

6. The system of claim 1, wherein the host of the URL is configured to proxy the content for the origin server.

7. The system of claim 1, wherein in response to a determination that the decrypted path is not associated with the secondary content whitelist, the hardware processor is configured to:
 set a content path as the path of the URL included in the request;
 set a content host as the host of the URL included in the request;
 retrieve the content at the content host and the content path; and
 communicate to the end user system the content retrieved at the content host and the content path.

8. The system of claim 1, wherein in response to a determination that the decrypted path is not associated with the secondary content whitelist, the hardware processor is configured to retrieve the content using the host and the path of the URL.

9. A method for using cryptography to deliver content in a content delivery network (CDN), the method comprising:
 under control of a hardware processor, receiving a request for a first content from an end user system, the request comprising a first uniform resource locator (URL) referencing a first origin server;
 retrieving the first content from the first origin server using the first URL, wherein the first content comprises a second URL referencing second content hosted by a second origin server, the second content comprising a link to secondary content;
 parsing the second URL to identify a path and a host associated with the second URL;
 in response to determining that the host is associated with a secondary content whitelist,
 decrypt the link to the secondary content to identify a secondary content server hosting the secondary content and a file path of the secondary content;
 encrypting at least a portion of the path to generate an encrypted path;
 modifying the host to reference the secondary content server to generate a modified host;
 modifying the second URL by replacing the path of the second URL with the encrypted path and replacing the host of the second URL with the modified host to generate a modified second URL;
 replacing the second URL in the first content with the modified second URL; and
 delivering the first content to the end user system, wherein the modified second URL is embedded in the first content, and wherein the modified second URL obfuscates an identity of the second content from a content blocker of the end user system.

10. The method of claim 9, wherein the first content comprises at least one of audio content, visual content, or a webpage.

11. The method of claim 10, wherein the first origin server is a content publisher server and the second origin server is the secondary content server.

12. The method of claim 9, further comprising: determining a type of the second content;
 in response to a determination that the type of the second content is HTML or JavaScript, detecting a plurality of URLs in the second content;
 for each URL of the plurality of URLs:
 separating the URL into a request host and a request path, the request host indicates the secondary content server;
 confirming the request host is in the secondary content whitelist; and
 in response to a confirmation that the request host is in the secondary content whitelist, setting the request host to reference the edge server and replacing the request path with an encrypted request path.

13. The method of claim 9, wherein the edge server is a proxy server which serves content to the end user system on behalf of the first origin server and the second origin server.

14. The method of claim 9, wherein encrypting at least a portion of the path comprises removing distinguishing characteristics associated with the path.

15. Non-transitory physical computer storage comprising computer-executable instructions stored thereon that, when executed by a hardware processor, implement operations for using cryptography to deliver content in a content delivery network (CDN), the operations comprising:

receiving a request from an end user system to retrieve content, wherein the content comprises a link to secondary content;

identifying a host of the content and an encrypted path to the content from the request, wherein the request includes a portion in an obfuscated form that obfuscates an identity of the content from a content blocker of the end user system;

decrypting the encrypted path to generate a decrypted path;

determining whether the decrypted path is associated with a secondary content whitelist; and in response to determining that the decrypted path is associated with the secondary content whitelist, decrypting the link to the secondary content to identify a secondary content server hosting secondary content and a file path of the secondary content;

modifying the request to obtain a modified request by setting the host of the content to the secondary content server and changing the encrypted path to be the decrypted path;

receiving the secondary content from the secondary content server using the decrypted path, and communicating the secondary content to the end user system.

16. The non-transitory physical computer storage of claim 15, wherein the secondary content whitelist comprises a mapping between the secondary content server and information associated with generating the decryption path.

17. The non-transitory physical computer storage of claim 15, wherein the request comprises a Hypertext Transfer Protocol request.

* * * * *